(No Model.)
J. E. EMERSON.
INSERTIBLE TOOTHED SAW.
No. 495,729. Patented Apr. 18, 1893.
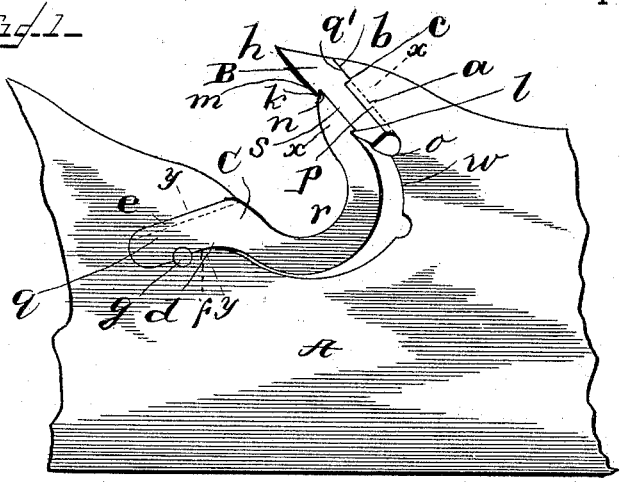
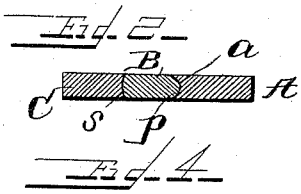
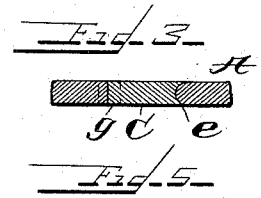
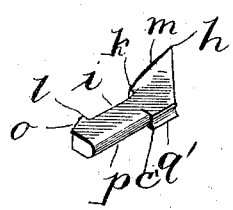
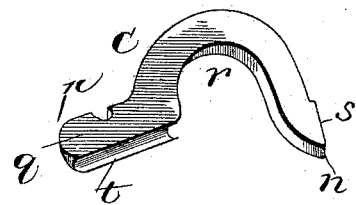
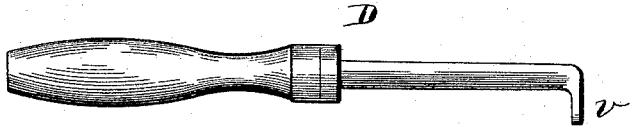
Witnesses
G. A. Tauberschmidt
H. B. Reinohl
Inventor
James E. Emerson
By D. E. Reinohl
Attorney

UNITED STATES PATENT OFFICE.

JAMES E. EMERSON, OF BEAVER FALLS, PENNSYLVANIA.

INSERTIBLE-TOOTHED SAW.

SPECIFICATION forming part of Letters Patent No. 495,729, dated April 18, 1893.

Application filed October 20, 1892. Serial No. 449,453. (No model.)

*To all whom it may concern:*

Be it known that I, JAMES E. EMERSON, a citizen of the United States, residing at Beaver Falls, in the county of Beaver and State of Pennsylvania, have invented certain new and useful Improvements in Insertible-Toothed Saws; and I do hereby declare the following to be a full, clear, and exact description of the invention, such as will enable others skilled in the art to which it appertains to make and use the same.

My present invention relates to saws and has especial reference to that class of saws which are provided with insertible and removable teeth, and has for its object certain improvements in construction which will be fully disclosed in the following specification and claims.

In the class of saws to which reference has been made, it has been the practice, for convenience and economy of construction, to make the back of the teeth circular, or elliptical throughout the length of the teeth, and to groove the saw-plate correspondingly to fit the teeth. In the use of these saws in hard timber, or when they strike a knot on one corner of the teeth, as in edging sawed timber, the teeth are liable to turn in the saw-plate and thus be thrown out of their proper position, and in some cases they have been thrown out of the saw-plate. It is my purpose to remedy this defect, and to this end I construct the back of the teeth with opposing surfaces to resist the tendency of the teeth turning in the saw-plate, and to provide for a slight yielding of the teeth in the saw-plate when they strike an unusually hard place in the timber.

With these objects in view I will proceed to describe my invention in connection with the accompanying drawings, which form part of this specification.

In the drawings Figure 1 represents a side elevation of a section of a saw provided with my improvements; Fig. 2, a section on the line X, X on Fig. 1; Fig. 3, a like view taken on the line $y$, $y$; Fig. 4, a perspective of a tooth detached; Fig. 5, a like view of the spring tooth-clamp or mouth-piece, and Fig. 6, a side view of a tool used to insert and remove the teeth.

Reference being had to the drawings and the letters thereon, A indicates a saw-plate, B an insertible tooth and C an insertible spring tempered tooth-clamp or mouth-piece. The saw-plate is provided with seats for the back of the teeth; (only one of which is shown for the purpose of illustration) which are concave at $a$, and said portion of the seat extends nearly two thirds of the length of the seat, and flat or as nearly flat as is practicable by preparing the seat with a file at $b$, and provided with a shoulder at $c$, the point where the concave portion of the seat terminates. The saw plate is also provided with a slot $d$ to receive the shank of the spring-mouth-piece. One edge $e$ of the wall of the slot $d$ is shown convex and the other edge $f$ flat; but both edges may be convex, semi-elliptical or, angular as insertible saw-teeth are usually made, and the mouth-piece may be secured in the saw-plate by means of a rivet $g$. The saw teeth are provided with a cutting edge $h$, a recess $i$ formed by shoulders $k$ and $l$, a slight swell or convex surface at $m$ to throw off saw dust and prevent its accumulation at the outer surface $n$ of the mouth-piece and being forced between the end of the mouth-piece and the saw-tooth, and an outwardly inclined heel $o$, to insure the forcing of the metal in the drop-die to form the shoulder $l$. The rear edge of the teeth is provided with a convex or elliptical part $p$ which engages the concave portion $a$ of the seat in the saw-plate, a shoulder $c'$ which engages the shoulder $c$ on the saw plate and with a part $q'$ which is preferably slightly concave to provide for any irregularities in the part $b$ of the seat and forms an opposing surface to prevent the teeth turning in the seat when they come in contact with hard timber or knots in edging timber.

The spring tempered tooth-clamp or mouth-piece C, is provided with a shank $q$ which enters and fills the slot $d$ in the saw-plate, is curved inwardly at $r$ to afford strength to securely hold the tooth in the saw-plate, by a yieldable pressure produced by the tension of the curved portion of the mouth-piece and is provided at its end with a projection $s$ which enters and fills the recess $i$ on the inner edge of the tooth. The shank of the mouth piece is concave on one edge $t$ to correspond with the edge $e$ of the wall of the slot $d$ and the opposite edge $u$ corresponds with the opposite wall $f$ of said slot.

D indicates a tool to be used for pressing the spring mouth-piece C back out of contact with the teeth, and is provided at one end with a right angled lever $v$ which is inserted in the seat $w$ in the saw-plate and between said plate and the inner surface of the mouth-piece, and force sufficient applied thereto to press the mouth-piece back and release the teeth to remove them, or hold the mouth-piece back while they are being inserted.

It will be observed that the shoulder $c$ on the rear edge of the saw tooth, and the shoulder $l$ on the front edge are opposed to each other and act conjointly to prevent the tooth being displaced in the saw-plate longitudinally against the force of the spring-mouth-piece; while the mouth-piece is capable of yielding slightly under excessive pressure, as when the tooth comes in contact with very hard timber or with a knot.

Having thus fully described my invention, what I claim is—

1. A saw-tooth provided on its rear edge with adjacent concave and convex surfaces and a shoulder near the outer end between the adjacent surfaces, and a recess on its front edge to engage a spring-clamp.

2. A saw-tooth provided on its rear edge with adjacent concave and convex surfaces and a shoulder near the outer end between the adjacent surfaces, a recess and a swell or convex surface on its front edge, in combination with a spring-clamp engaging the tooth.

3. A saw-tooth provided on its rear edge with adjacent concave and convex surfaces and a shoulder near the outer end, and an opposing shoulder on its front edge near the inner end, in combination with a saw-plate having a seat provided with bearing surfaces corresponding with those of the tooth, and a spring-tempered and yieldable clamp or mouth-piece engaging the recess in the front edge of the tooth.

4. The combination with a saw-plate provided with an angular slot, an insertible spring-tempered mouth-piece provided with a shank to enter said slot, a rearwardly curved portion and a projection at its free end, and a saw-tooth having a recess in its front edge.

5. The combination of a saw-plate provided with a concave seat $a$, shoulder $c$, and seat $b$, an insertible tooth provided with a convex part $p$, shoulder $c'$ and part $q'$ and a mouth-piece engaging the front edge of the tooth and provided with a curved portion $r$ to produce yieldable pressure upon the tooth.

In testimony whereof I affix my signature in presence of two witnesses.

JAMES E. EMERSON.

Witnesses:
D. C. REINOHL,
H. B. REINOHL.